(12) United States Patent
Lacey, III

(10) Patent No.: US 6,952,430 B2
(45) Date of Patent: Oct. 4, 2005

(54) SYSTEM AND METHOD FOR INTERFACING A DATA LINK PROTOCOL ENGINE AND A PHYSICAL LAYER

(75) Inventor: Herbert Lyvirn Lacey, III, Garner, NC (US)

(73) Assignee: Globespanvirata Incorporated, Red Bank, NJ (US)

( * ) Notice: Subject to any disclaimer, the term of this patent is extended or adjusted under 35 U.S.C. 154(b) by 752 days.

(21) Appl. No.: 09/683,763

(22) Filed: Feb. 12, 2002

(65) Prior Publication Data

US 2003/0128669 A1 Jul. 10, 2003

Related U.S. Application Data

(60) Provisional application No. 60/343,198, filed on Dec. 31, 2001.

(51) Int. Cl.[7] .................................................. H04J 3/12
(52) U.S. Cl. ...................................... 370/503; 370/526
(58) Field of Search ................................ 370/503, 525, 370/526, 350, 465, 469; 375/222, 354

(56) References Cited

U.S. PATENT DOCUMENTS

| | | | |
|---|---|---|---|
| 5,852,631 A | * 12/1998 | Scott ........................... | 375/222 |
| 6,055,268 A | 4/2000 | Timm et al. | |
| 6,091,710 A | * 7/2000 | Mawhinney ................. | 370/236 |
| 6,167,034 A | * 12/2000 | Langberg et al. ........... | 370/281 |
| 6,252,901 B1 | 6/2001 | Mueller et al. | |
| 6,337,877 B1 | * 1/2002 | Cole et al. ................... | 375/222 |
| 6,714,589 B1 | * 3/2004 | Cole ........................... | 375/222 |

OTHER PUBLICATIONS

DSL Technology. Where High Speed Data Communications Can Be Provided Over Unshielded Twisted Pair Copper Cable. Aug. 20, 2001 <http://www.telebyteusa.com/dsl-primer/dslfull/htm>.

International Telecommunication Union. "Draft New Recommendation G. 994.1—Handshake Procedures for Digital Subscriber Line (DSL) Transceivers—For Approval." Telecommunication Standardization Sector, 1999.

"DSL Technology: Where High Speed Data Communications Can Be Provided Over Unshielded Twisted Pair Copper Cable." *Telebyte Primer* Aug. 29, 2001. May 13, 2002 <http://www.telebyteusa.com/dslprimer/dslfull.htm>.

\* cited by examiner

*Primary Examiner*—Ajit Patel
(74) *Attorney, Agent, or Firm*—Hunton & Williams, LLP

(57) ABSTRACT

A system and method is provided for interfacing a protocol component with a physical layer component. Initially, a parameter setting message is sent to the physical layer indicating at least the mode of the processor. If the mode is nonframing, a handshaking tone or pattern detection request message is sent to the physical layer component enabling detection of specific handshaking tones or patterns. Next, a handshaking tone or pattern detection indicate message is received from the physical layer component indicating that a recognized tone or bit pattern has been detected in response to a detection request message. A signal request message is sent from the handshaking component to the physical layer component indicating that a handshaking message is to be transmitted as well as the content of that message. In addition, the signal request message also preferably includes parameters relating to the duration of the signal to be transmitted, such as a maximum and minimum symbol number. If these parameters are infinite the physical layer will continue to transmit the signals forever. A handshaking signal confirmation message is received by the handshaking component from the physical layer component indicating that requested signal has been transmitted for the maximum number of symbols.

24 Claims, 3 Drawing Sheets

SYSTEM AND METHOD FOR INTERFACING A DATA LINK PROTOCOL ENGINE AND A PHYSICAL LAYER

CROSS REFERENCE TO RELATED APPLICATIONS

This application claims the benefit of U.S. provisional patent application Ser. No. 60/343,198 filed Dec. 31, 2001, the disclosure of which is incorporated herein by reference.

BACKGROUND OF THE INVENTION

The present invention relates generally to data processing systems, and in particular, to systems and methods for transmitting and receiving information between such systems across a computer network.

Most modern telecommunications systems utilize some type of modem to package, transmit and receive data a physical medium such as conventional copper telephone lines, fiber optic networks, wireless networks, etc. Generally speaking, a modem is a generic term for any of a variety of modulator/demodulator (hence the term "modem") devices, which, upon transmission, essentially format digital data signals into signals compatible with the type of network being utilized. In the case of conventional telephone modems, a modem operates to modulate a data signal generated by a computer into an analog format compatible with the PSTN (public switched telephone network). Such modulation may be accomplished in any of a variety of manners, dependent only upon the network protocol as well as the bandwidth capability of the physical medium being used. Examples of modulation techniques may include frequency shift keying (FSK), phase shift keying (PSK), differential phase shift keying (DPSK), and quadrature amplitude modulation (QAM). Essentially, these techniques conduct a bitwise conversion of the digital signal into a corresponding analog signal having a frequency related to the original digital value. In a similar manner to the transmission modulation techniques, modems also operate to receive and demodulate signals back into digital formats readable by a receiving terminal.

As the need for higher speed networks has increased, technology has developed which enables conventional networks to surpass the conventional bandwidth limitations of the PSTN network (i.e., a single 3000 Hz signal transmitted between a user and the phone company's nearest central office (CO)). One such technology generating significant interest is Asynchronous Digital Subscriber Line technology or ADSL. Unlike a conventional modem, an ADSL modem takes advantage of the fact that any normal home, apartment or office has a dedicated copper wire running between it and nearest CO. This dedicated copper wire can carry far more data than the 3,000 hertz signal needed for your phone's voice channel. By equipping both the user and the CO with ADSL modems, the section of copper wire between the two can act as a purely digital high-speed transmission channel having a capacity on the order of 10 Mbps (million bits per second). In essence, an ADSL modem operates to utilize the otherwise unused portion of the available bandwidth in the copper lines, i.e., the bandwidth between 24,000 and 1,100,000 Hz.

Prior to any transmission of actual data between the CO (ATU-C) and the remote computer (ATU-R), the two entities must first undergo a initialization procedure designed to familiarize the two entities with each other, identify the bandwidth capabilities for the current session, and further facilitate the establishment of a valid connection. Pursuant to ADSL standards provided by the International Telecommunication Union-Telecommunication Standardization Sector (ITU-T), these initialization procedures comprise the following: 1) a handshake procedure; 2) a transceiver training session; 3) a channel analysis session; 4) an exchange session; and finally 5) an actual data transmission session referred to as "showtime".

Relating specifically to the handshake procedure, this procedure is designed to enable peer components to initiate a communications session between each other and generally includes the exchange of several specific messages conveyed on modulated carriers having discrete carrier frequencies typically a multiple of either 4.3125 kHz or 4 kHz. Examples of such messages include the following: capabilities list and capabilities list request messages; mode select and mode request messages; various acknowledge and negative acknowledge messages, etc. Each of the above messages is generally formulated by a protocol processor responsible for making sure that the requirements for protocol communication are complied with. In particular, the specific messages utilized in a handshake session are sent with one or more carrier sets. All carrier frequencies within a carrier set, as well as all of the carrier sets are simultaneously modulated using DPSK modulation in the data pump.

Although the protocol standards for the handshaking session stipulates the types of messages and the manner of their formation as described above, the standards fail to expressly indicate the preferred manner for providing an interface between the protocol processing and the physical layer. Accordingly, there is a need for a system of interfacing a protocol component with a data pump component and an analog front end (AFE) such that the messages are properly received and transmitted with minimal timing requirements.

SUMMARY OF THE INVENTION

The present invention overcomes the problems noted above, and provides additional advantages, by providing a system and method for interfacing a protocol component with a physical layer component. Initially, a parameter setting message is sent to the physical layer indicating at least the mode of the processor. If the mode is nonframing, a handshaking tone or pattern detection request message is sent to the physical layer component enabling detection of specific handshaking tones or patterns.

Next, a handshaking tone or pattern detection indicate message is received from the physical layer component indicating that a recognized tone or bit pattern has been detected in response to a detection request message. A signal request message is sent from the handshaking component to the physical layer component indicating that a handshaking message is to be transmitted as well as the content of that message. In addition, the signal request message also preferably includes parameters relating to the duration of the signal to be transmitted, such as a maximum and minimum symbol number. If these parameters are infinite the physical layer will continue to transmit the signals forever.

A handshaking signal confirmation message is received by the handshaking component from the physical layer component indicating that requested signal has been transmitted for the maximum number of symbols.

DETAILED DESCRIPTION OF THE INVENTION

Figure 1:
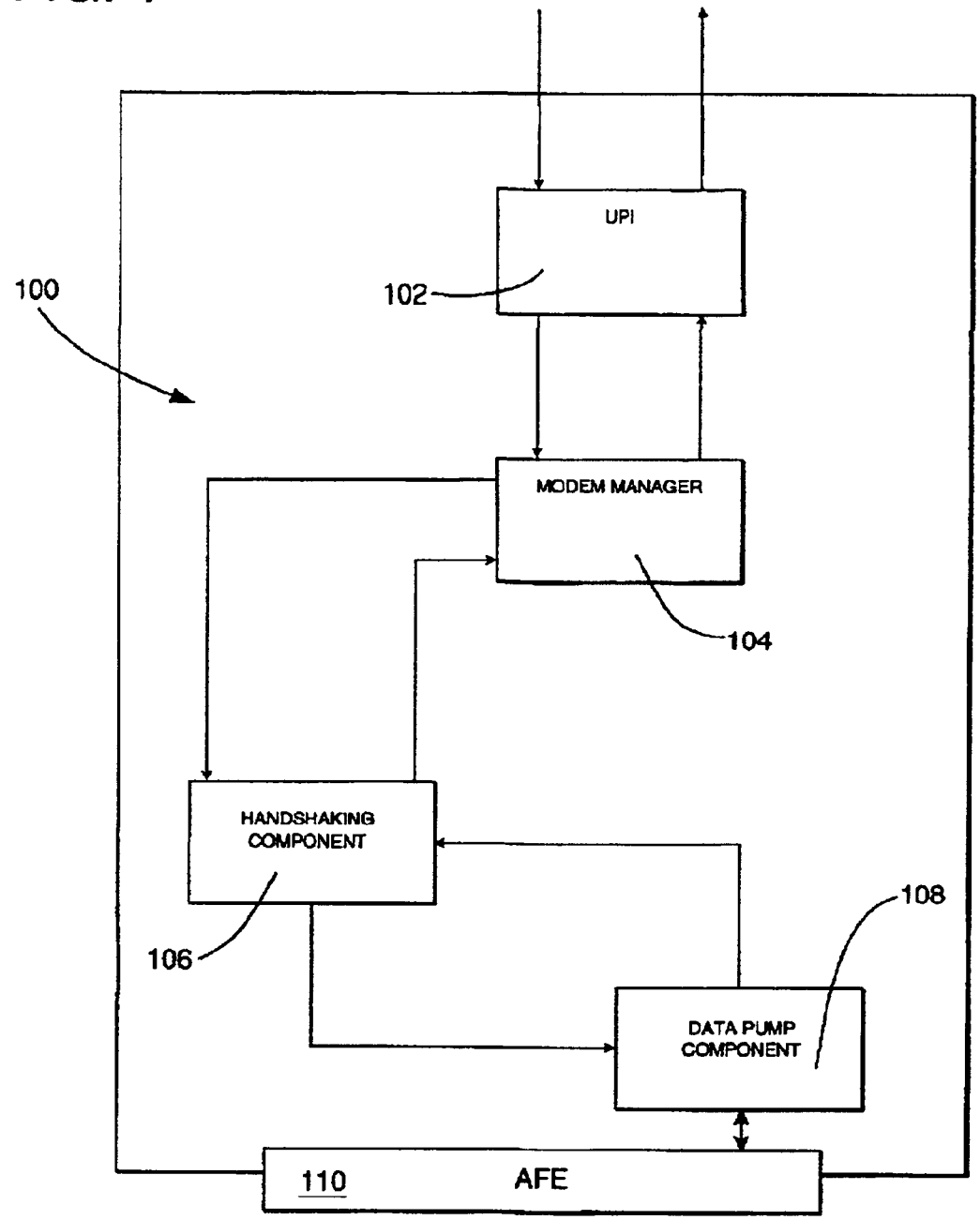
FIG. 1 is a simplified block diagram of portions of a communications transceiver incorporating the interface of the present invention.

Referring now to the Figures and, in particular, to FIG. 1, there is shown a simplified block diagram of portions of a communications transceiver 100 incorporating the interface of the present invention. In particular, transceiver 100 includes a Universal Programming Interface (UPI) 102 which enables connection to the computer or terminal that provides the data signals for transmission by the transceiver 100. UPI 102 is operatively connected to a modem manager 104 which determines which state the modem should be in, i.e., handshaking, training, showtime, etc. A handshaking component 106 is operatively connected to the modem manager and, in response to instructions from the modem manager 104, operates to set the various parameters and initiate the various messages required by the handshaking process. A data pump component 108 is operatively connected to the handshaking component 106 and the analog front end 110 for modulating any generated messages and relaying them to the AFE 110 and also for receiving messages from the AFE 110 and demodulating them for relay and interpretation by the handshaking component 106.

The present invention is a means for interfacing the protocol handshake component 106 and the physical layer data pump and AFE components 108 and 110 in a timing-independent manner. The interface provides for configuration and control sufficient to enable data transception pursuant to the requirements of the standard line protocol. In addition the interface provides for tone transmission and detection of messages according to the requirements of ADSL handshaking process. Further, the interface of the present invention is a message based and timing independent interface. A key objective of this interface is to hide the implementation of data and signal transception, which involves significant timing information, underneath a clean interface displaying only the attributes needed to meet the physical layer requirements of the protocol.

Figure 2:
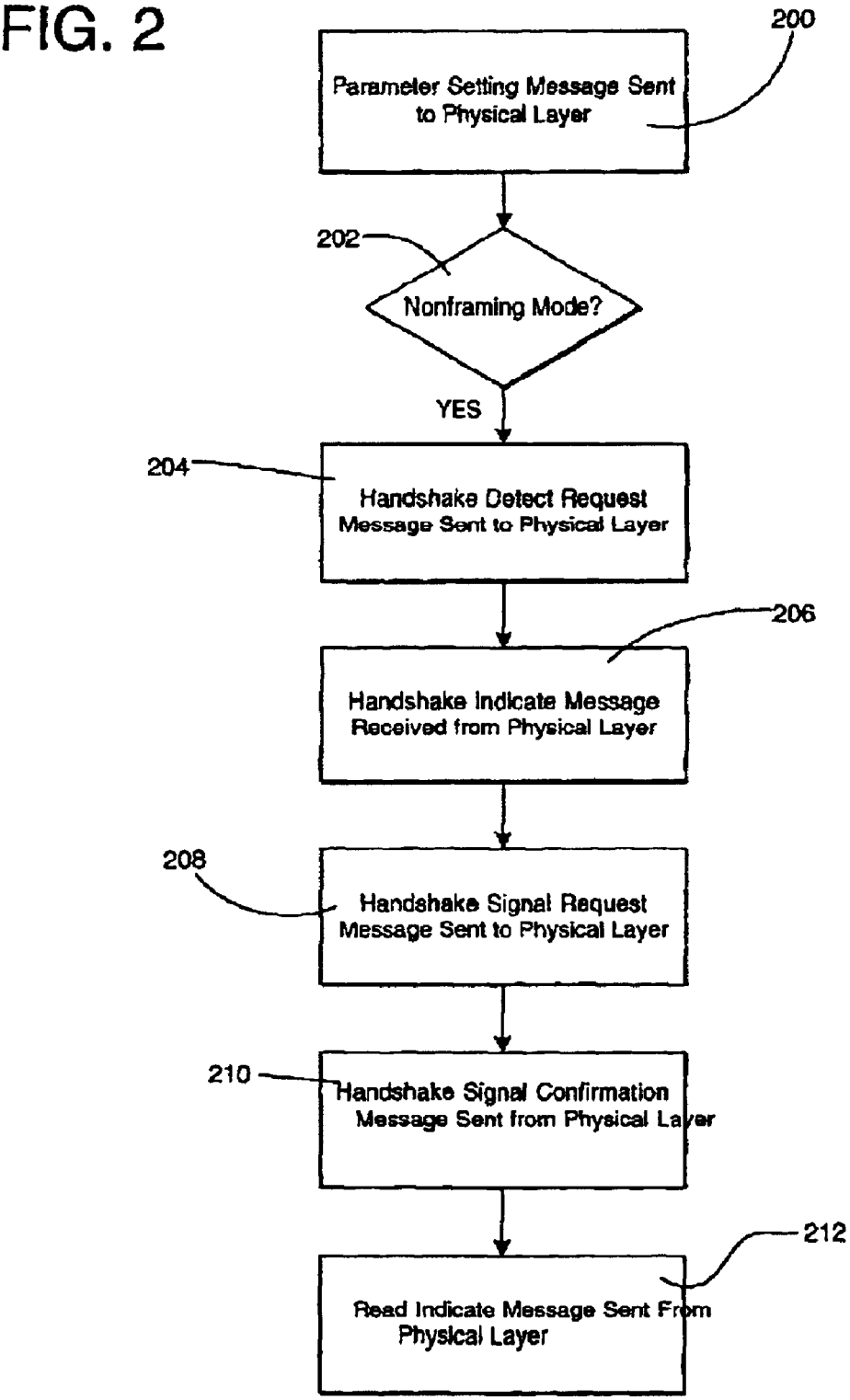
FIG. 2 is a flow diagram illustrating one embodiment of a method for interfacing the handshaking protocol component with a physical layer component in accordance with the present invention.

Referring now to FIG. 2, there is shown a flow diagram illustrating one embodiment of a method for interfacing a handshaking protocol component with a physical layer component in accordance with the present invention. Initially, in step 200 a parameter setting message (SET_PARM) is sent to the physical layer indicating several pieces of information including: 1) the mode of the physical layer (i.e., framing or non-framing); 2) a fill character to be inserted in framing mode; and 3) a fill count indicating the number of fill characters to be sent before each frame. In accordance with the handshaking protocol, handshaking messages are only exchanged in nonframing mode, and are typically generated as tones for a defined number of symbols.

In step 202, it is determined whether the mode indicated in step 200 is framing or nonframing. If in nonframing mode, a handshaking tone or pattern detection request message (DETECT_REQ) is sent to the physical layer component in step 204 enabling detection of a handshaking tone or pattern from the AFE. In one embodiment, the DETECT_REQ message contains a parameter indicative of the of the tones or patterns to be detected. Such a parameter may implement a bit map scheme listing recognized tones as defined by the applicable standard.

In step 206, a handshaking tone or pattern detection indicate message (DETECT_IND) is received from the physical layer component indicating that a recognized tone or bit pattern has been detected in response to a DETECT_REQ message. In step 208, a signal request message (SIGNAL_REQ) is sent from the handshaking component to the physical layer component indicating that a handshaking message is to be transmitted. This message further indicates the type of message to be sent utilizing the same bit map scheme referenced in steps 204 and 206. In addition, the SIGNAL_REQ message also preferably includes parameters relating to the duration of the signal to be transmitted, such as a maximum and minimum symbol number. If these parameters are infinite the physical layer will continue to transmit the signals forever.

In step 210, a handshaking signal confirmation message (SIGNAL_CFM) is received by the handshaking component from the physical layer component indicating that requested signal has been transmitted for the maximum number of symbols. In step 212 a read indicate message (READ_IND) is received by the handshaking component from the physical layer component indicating various types of data messages or error indications such as buffer overrun errors, loss of carrier, etc.

Using the methodology set forth above, a handshaking component and a physical layer component may exchange messages in a timing-independent manner. Because the interface does not include any information specifically related to the messages received, the interface is able to operate smoothly in all manner of operating conditions, regardless of message or frame content.

The following is one example of computer software code for implementing the interface methodology of the present invention. The text in the header file included below defines the interface.

```
/********************************************************************
/
/       File: dpsk_if.h
/
/       Function:   This file provides definitions used to interface to the
/                   DPSK component.
/
*********************************************************************/
#ifndef __DPSKIF_H
#define __DPSKIF_H
/********************************************************************
/
```

```
/ DETECT_REQ   sent to DPSK processor to enable the detection of a handshaking
/              tone or bit pattern; defines tone or bit pattern to be detected
/              'Quiet' mode, Flags, and Galf are supported. Detection continues
/              until detection is turned off or until signal is detected. This message
/              contains a parameter which indicates the tone/bit pattern to detect.
/              The parameter will use the "HS_G9941" bit map for tones defined by
/              G.994.1, or the "HS_T1413" bit map for the tones listed in G.994.1
/              Annex A as T1.413 Issue 2 tones. DETECT_REQ can only be done when
/              FRAMING is OFF.
/
/ DETECT_IND   received from DPSK processor when tone or bit pattern has been
/              detected (reported once per configured detection). The parameter will
/              use the "HS_G9941" bit map for tones defined by G.994.1, or the
/              "HS_T1413" bit map for the tones listed in G.994.1 Annex A as
/              T1.413 Issue 2 tones. DETECT_IND can only be sent when FRAMING is OFF.
/
/ SIGNAL_REQ   sent to DPSK processor to send a handshaking tone/bit pattern;
/              defines tone or bit pattern to be transmitted. 'Quiet' mode, Flags,
/              and Galf are supported. Signals are transmitted forever. The parameter
/              will use the "HS_G9941" bit map for tones defined by 0.994.1. There is
/              no support for sending T1.413 Issue 2 tones. SIGNAL_REQ can only be
/              done when FRAMING is OFF. In addition to the signal bit map, the
/              SIGNAL_REQ message contains two parameters which indicate the
/              minimum and maximum number of symbols for which the signal shall be
/              sent. If minimum and maximum are not both infinite, DPSK shall
/              send a SIGNAL_CFM when the signal has been sent for the configured
/              maximum. Similarly, if minimum and maximum are not both infinite,
/              DPSK shall send the outstanding signals for at least the configured
/              minimum. "Infinite" is as defined in this interface file. DPSK must
/              finish sending outstanding messages and signals before closing. The
/              maximum symbol value must be used for the last signal to be sent.
/
/
/ SIGNAL_CFM   received from DPSK processor when tone or bit pattern has been
/              transmitted for the configured maximum number of symbols (reported
/              once per configured transmission). SIGNAL_CFM shall be sent if
/              either of the maximum or minimum number of symbols in the SIGNAL_REQ are
/              not infinite. SIGNAL_CFM shall not be sent if both of the maximum and
/              minimum number of symbols in the SIGNAL_REQ are infinite. The parameter
/              will use the "HS_G9941" bit map for tones defined by G.994.1.
/
***********************************************************************/
/* Framing must be OFF for Signals */
/* When Framing is OFF, TxFillChar and RxFillChar should be set to NULL */
/*
 * note that the HS_G9941_ and HS_T1413_ defines are unique, since
 * both are contained simultaneously in one U32 parameter, mapped onto
 * the "payload" field of SCTMSG (defined in file SCTIF.H)
 */
/* Handshaking G.994.1 Tone Defines */
/* the HS_G9941 defines are for both SIGNAL_REQ and DETECT_IND */
#define HS_G9941_TONE_OFF         0x00000000   /*
                                                * G.994.1 tone
                                                * detection and
                                                * transmission OFF
                                                */
#define HS_G9941_SILENCE          0x00000001   /* silence */
#define HS_G9941_CTONES_HDX       0x00000010   /* CTones Half-Duplex */
#define HS_G9941_CTONES_FDX       0x00000040   /* CTones Full-Duplex */
#define HS_G9941_RTONESREQ        0x00000100   /* R-Tones-Req */
#define HS_G9941_RTONE1           0x00001000   /* RTone1 */
#define HS_G9941_GALF             0x10000000   /* GALF (0x81) */
#define HS_G9941_FLAG             0x40000000   /* FLAG (Fill Char) */
/* G.994.1. Annex A specifies ATU C must detect R_ACKREQ and */
/* ATU R must detect C_ACT1, C_ACT2, C_ACT3, C_ACT4, and C_TONE */
/* simultaneously */
/* Handshaking T1413 Issue 2 Detection Defines */
/* the HS T1413 defines are for DETECT IND only */
#define HS_T1413_TONE_OFF         0x00000000      /*
                                                   * T1.413 Issue 2
                                                   * tone detection
                                                   * OFF
                                                   */
#define HS_T1413_R_ACKREQ         0x00010000   /* detect R-ACKREQ   */
#define HS_T1413_C_ACT1           0x00100000   /* detect C-ACT1     */
#define HS_T1413_C_ACT2           0x00200000   /* detect C-ACT2     */
#define HS_T1413_C_ACT3           0x00400000   /* detect C-ACT3     */
#define HS_T1413_C_ACT4           0x00800000   /* detect C-ACT4     */
#define HS_T1413_C_TONE           0x01000000   /* detect C-TONE     */
```

-continued

```
/* for DETECT_REQ and SIGNAL_REQ mag payload type casting */
typedef U32 SIGNAL;
typedef U16 MINSYM;
typedef U16 MAXSYM;
/* for SIGNAL_REQ maximum and minimum */
/* these are unsigned sixteen bit numbers */
#define      NO_SYMBOLS              0x0000U
#define      SEND_FOREVER            0xFFFFU
#define      MIN_RSILENT_SYMBOLS     0x012CU   /* 300 symbols ~= 50 milliseconds */
#define      MAX_RSILENT_SYMBOLS     0x0BB8U   /* 3000 symbols ~= 500 milliseconds
             */
/* The HS_SIGNAL_REQ parameter is mapped onto the "payload" field of SCTMSG */
/* (defined in file SCTIF.H) */
typedef struct Hs_Signal_Req {
        SIGNAL          SignalReq;      /* tone or bit pattern to transmit */
        MINSYM          MinSymbolCount; /*
                                         * minimum number of symbols to transmit tone
                                         * or bit pattern
                                         */
        MAXSYM          MaxSymbolCount; /*
                                         * maximum number of symbols to transmit tone
                                         * or bit pattern
                                         */
} HS_SIGNAL_REQ;
/****************************************************************
/
/ SET_PARM; sent to DPSK signal processor
/        set mode        turns on or off frame reception
/        set fill char   sets fill char (0x7E normally)
/                        when framing turned on
/        fill count      number of fill chars sent before every frame
/
****************************************************************/
typedef enum {
        HS_FRAMING_OFF = 0,  /* framed data mode off */
        HS_FRAMING_ON        /* framed data mode on */
        } HS_FRAME_MODE;
/* in mode HS_FRAMING_OFF, the data pump is not in framed data mode */
/* DETECT_REQ and SIGNAL_REQ can only be done when FRAMING_OFF */
/* in mode HS_FRAMING_ON, the data pump is in framed data mode */
/* Data can only be transceived when FRAMING_ON */
/* When Framing is OFF, TxFillChar and RxFillChar should be set to NULL */
/* Data can only be transceived when FRAMING_ON */
/* The HS_SET_PARM parameter is mapped onto the "payload" field of SCTMSG */
/* (defined in file SCTIF.H) */
typedef struct Hs_Set_Parm {
        HS_FRAME_MODE TxFrameMode; /* turns Transmit framing on or off */
        HS_FRAME_MODE RxFrameMode; /* turns Receive framing on or off */
        U8 TxFillChar;      /* sets fill char for Tx when framing turned on
                             *   (0x7E normally)
                             */
        U8 RxFillChar;      /* sets fill char for Rx when framing turned on
                             *   (0x7E normally)
                             */
        U8 TxFillCount;     /* number of fill chars sent between frames */
        U8 RxFillCount;     /* number of fill chars received between frames */
        BOOL Reset;         /*
                             * if TRUE, all other fields are ignored, and DPSK
                             * is RESET. No effect otherwise.
                             */
        BOOL bTxNoData;
} HS_SET_PARM;
/****************************************************************
/
/ READ_IND received from DPSK signal processor, can specifiy data messages
/       or error indications like overrun, loss of carrier, etc.
/
****************************************************************/
/* The READ_IND parameter is mapped onto the */
/* "modifier" field of SCTDATAMSG (defined in file SCTIF.H) */
typedef emum {
              HSFRAME_NO_ERROR = 0,  /* no error detected on this frame */
              HSOVERRUN,             /* rx overrun error detected on this frame */
              HSCARRIER_LOSS,        /* remote carrier loss detected */
              HSINVAILID_FRAME       /*
                                      * frame was received with
                                      * less than the number "RxFillCount" of the
         character
                                      * "RxFillChars" between frames
```

```
        */
    } HS_RX_FRAME_ERROR;
#endif /* _DPSKIF_H */
```

Figure 3:
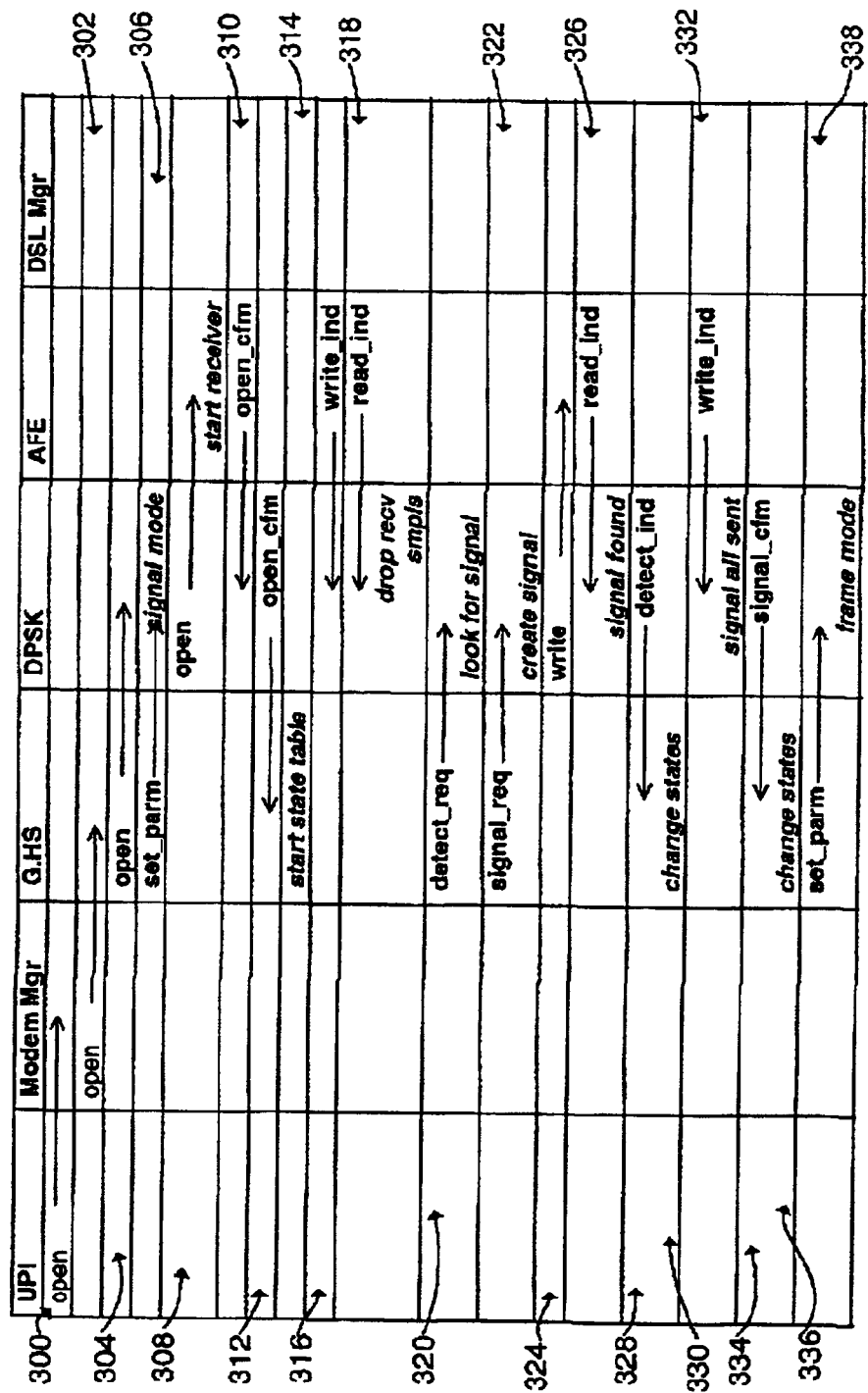
FIG. 3 is a flow diagram illustrating an embodiment of a typical message flow between the handshaking protocol component and a DPSK physical layer component in accordance with the present invention.

Referring now to FIG. 3, there is shown a flow diagram illustrating an embodiment of a typical message flow between the a handshaking protocol component and a DPSK physical layer component in accordance with the present invention. In step 300, the UPI sends an OPEN message to the modem manager, indicating that the terminal is open for data transmission. Upon determining that the handshaking process needs undertaken, the modem manager likewise sends an OPEN message to the handshaking component in step 302, indicating that it should perform the handshaking process. Next, in step 304, the handshaking component sends an OPEN message to the DPSK component indicating that signal transmission and reception will begin.

Once open, the handshaking component sends a SET_PARM message to the DPSK component in step 306, indicating that the mode should be set to nonframing, thereby enabling transception of handshaking tones or patterns. In step 308, the DPSK component sends an OPEN message to the AFE indicating that reception should start. In response, the AFE sends an open confirmation message (OPEN_CFM) to the DPSK component in step 310, indicating that reception has started. In response, the DSPK component sends a similar OPEN_CFM message to the handshaking component in step 312.

In step 314, the handshaking component starts a state which defines the handshaking component's response to each protocol event. Operation continues to be controlled by the state table, where signals and messages are received from the communications link, passed through the subject interface, interpreted as events and responses generated by the protocol engine, and appropriate communication to the remote peer system are effected through the subject interface, until handshaking is completed and data mode may begin. In step 316, the AFE sends a write indicate message (WRITE_IND) and a read indicate message (READ_IND) to the DPSK component indicating that messages have been received on the line and forwarding the samples to the DPSK. However, since a DETECT_REQ message hasn't yet been received by the DPSK component from the handshaking component, the received samples are dropped in step 318. In step 320, a DETECT_REQ message is sent to the DPSK component enabling the DSPK to respond to received handshaking signals forwarded from the AFE.

In step 322, a SIGNAL_REQ message is sent to the DPSK component requesting that a specific message signal be transmitted on the wire. In response, the DPSK component sends a WRITE message to the AFE in step 324. In step 326, a READ_IND message is sent from the AFE to the DPSK indicating that a message has been found on the wire. In response, the DPSK component sends a DETECT_IND message to the handshaking component in step 328 including the discovered message. In response, the handshaking component changes states to reflect the received message in step 330.

In step 332, a WRITE_IND message is sent from the AFE to the DPSK component indicating that the message requested in step 324 has been transmitted for its maximum number of symbols. In step 334, a corresponding SIGNAL_CFM message is sent to the handshaking component. In response, the handshaking component changes states again in step 336. In step 338, the handshaking component sends a SET_PARM message to the DPSK component indicating a change in mode to a framing mode for subsequent data transmission.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. A method for interfacing a data link protocol engine and a physical layer component, comprising the steps of:
   sending a parameter setting message to the physical layer component;
   sending a handshaking tone or pattern detection request message to the physical layer component;
   receiving a handshaking tone or pattern detection indicate message from the physical layer component indicating that a recognized tone or bit pattern has been detected;
   sending a signal request message to the physical layer component indicating that a handshaking message is to be transmitted; and
   receiving a handshaking signal confirmation message from the physical layer component indicating that the requested signal has been transmitted for the maximum number of symbols.

2. The method of claim 1, further comprising the step of receiving a read indicate message from the physical layer component indicating various types of data messages or error indications.

3. The method of claim 1, wherein the parameter setting message includes information indicating: 1) the mode of the physical layer; 2) a fill character to be inserted in framing mode; and 3) a fill count indicating the number of fill characters to be sent before each frame.

4. The method of claim 3, further comprising the step of determining whether the mode is a framing or nonframing mode.

5. The method of claim 1, wherein the detection request message includes a parameter indicative of the of the tones or patterns to be detected.

6. The method of claim 5, wherein the parameter indicative of the of the tones or patterns to be detected implements a bit map scheme listing recognized tones.

7. The method of claim 1, wherein the signal request message includes a parameter indicative of the type of handshaking message to be transmitted.

8. The method of claim 1, wherein the signal request message includes a parameter indicative of the duration of the handshaking message to be transmitted.

9. A system for interfacing a data link protocol engine and a physical layer component, comprising:
   means for sending a parameter setting message to the physical layer component;
   means for sending a handshaking tone or pattern detection request message to the physical layer component;

means for receiving a handshaking tone or pattern detection indicate message from the physical layer component indicating that a recognized tone or bit pattern has been detected;

means for sending a signal request message to the physical layer component indicating that a handshaking message is to be transmitted; and means for receiving a handshaking signal confirmation message from the physical layer component indicating that the requested signal has been transmitted for the maximum number of symbols.

10. The system of claim 9, further comprising means for receiving a read indicate message from the physical layer component indicating various types of data messages or error indications.

11. The system of claim 9, wherein the parameter setting message includes information indicating: 1) the mode of the physical layer; 2) a fill character to be inserted in framing mode; and 3) a fill count indicating the number of fill characters to be sent before each frame.

12. The system of claim 11, further comprising means for determining whether the mode is a framing or nonframing mode.

13. The system of claim 9, wherein the detection request message includes a parameter indicative of the of the tones or patterns to be detected.

14. The system of claim 13, wherein the parameter indicative of the of the tones or patterns to be detected implements a bit map scheme listing recognized tones.

15. The system of claim 9, wherein the signal request message includes a parameter indicative of the type of handshaking message to be transmitted.

16. The system of claim 9, wherein the signal request message includes a parameter indicative of the duration of the handshaking message to be transmitted.

17. A computer readable medium incorporating one or more instructions for interfacing a data link protocol engine and a physical layer component, the instructions comprising:

one or more instructions for sending a parameter setting message to the physical layer component;

one or more instructions for sending a handshaking tone or pattern detection request message to the physical layer component;

one or more instructions for receiving a handshaking tone or pattern detection indicate message from the physical layer component indicating that a recognized tone or bit pattern has been detected;

one or more instructions for sending a signal request message to the physical layer component indicating that a handshaking message is to be transmitted; and one or more instructions for receiving a handshaking signal confirmation message from the physical layer component indicating that the requested signal has been transmitted for the maximum number of symbols.

18. The computer readable medium of claim 17, the instructions further comprising one or more instructions for receiving a read indicate message from the physical layer component indicating various types of data messages or error indications.

19. The computer readable medium of claim 17, wherein the parameter setting message includes information indicating: 1) the mode of the physical layer; 2) a fill character to be inserted in framing mode; and 3) a fill count indicating the number of fill characters to be sent before each frame.

20. The computer readable medium of claim 19, the instructions further comprising one or more instructions for determining whether the mode is a framing or nonframing mode.

21. The computer readable medium of claim 17, wherein the detection request message includes a parameter indicative of the of the tones or patterns to be detected.

22. The computer readable medium of claim 21, wherein the parameter indicative of the of the tones or patterns to be detected implements a bit map scheme listing recognized tones.

23. The computer readable medium of claim 17, wherein the signal request message includes a parameter indicative of the type of handshaking message to be transmitted.

24. The computer readable medium of claim 17, wherein the signal request message includes a parameter indicative of the duration of the handshaking message to be transmitted.

* * * * *